(12) United States Patent
Sano

(10) Patent No.: US 8,007,029 B2
(45) Date of Patent: Aug. 30, 2011

(54) ATTACHMENT ASSEMBLY FOR AERODYNAMIC PERFORMANCE IMPROVEMENT COVER

(75) Inventor: Takahiro Sano, Toyohashi (JP)

(73) Assignee: Newfrey LLC, Newark, DE (US)

( * ) Notice: Subject to any disclaimer, the term of this patent is extended or adjusted under 35 U.S.C. 154(b) by 327 days.

(21) Appl. No.: 12/245,097

(22) Filed: Oct. 3, 2008

(65) Prior Publication Data
US 2009/0096249 A1  Apr. 16, 2009

(30) Foreign Application Priority Data

Oct. 15, 2007  (JP) .................. 2007-267880

(51) Int. Cl.
B62D 35/02  (2006.01)
(52) U.S. Cl. .................................. 296/180.1
(58) Field of Classification Search .............. 296/180.1, 296/29, 30, 204, 193.07, 191, 187.08; 52/506.01, 52/506.05, 506.06
See application file for complete search history.

(56) References Cited

U.S. PATENT DOCUMENTS

| | | | | |
|---|---|---|---|---|
| 4,352,589 A * | 10/1982 | Allison et al. | ............. | 403/408.1 |
| 4,973,102 A * | 11/1990 | Bien | ............. | 296/187.01 |
| 5,037,259 A * | 8/1991 | Duran et al. | ............. | 411/173 |
| 5,040,917 A * | 8/1991 | Camuffo | ............. | 403/408.1 |
| 5,098,765 A * | 3/1992 | Bien | ............. | 428/134 |
| 5,139,361 A * | 8/1992 | Camuffo | ............. | 403/408.1 |
| 5,513,893 A * | 5/1996 | Nakata et al. | ............. | 296/180.1 |
| 5,599,148 A * | 2/1997 | Hirose | ............. | 411/175 |
| 5,964,490 A * | 10/1999 | Schroeder et al. | ............. | 296/35.1 |
| 6,308,476 B1 * | 10/2001 | Nakamoto et al. | ............. | 52/217 |
| 6,394,537 B1 * | 5/2002 | DeRees | ............. | 296/191 |
| 6,435,298 B1 * | 8/2002 | Mizuno et al. | ............. | 180/346 |
| 6,575,522 B2 * | 6/2003 | Borghi et al. | ............. | 296/180.5 |
| 6,672,672 B1 * | 1/2004 | Severini | ............. | 297/463.1 |
| 6,824,203 B2 * | 11/2004 | Kanie | ............. | 296/204 |
| 7,828,372 B2 * | 11/2010 | Ellison | ............. | 296/191 |
| 2005/0046215 A1 * | 3/2005 | Chung | ............. | 296/29 |
| 2005/0052056 A1 | 3/2005 | Kanie | | |
| 2007/0248436 A1 | 10/2007 | Sano | | |

FOREIGN PATENT DOCUMENTS

| | | |
|---|---|---|
| DE | 19630249 A1 | 2/1997 |
| EP | 1849687 A2 | 10/2007 |
| JP | H7-081629 | 3/1995 |
| JP | 2006205910 | 8/2006 |
| JP | 2007145097 | 6/2007 |

OTHER PUBLICATIONS

Extended European Search Report dated Apr. 31, 2010.

* cited by examiner

*Primary Examiner* — Glenn Dayoan
*Assistant Examiner* — Gregory Blankenship
(74) *Attorney, Agent, or Firm* — Michael P. Leary

(57) ABSTRACT

An attachment assembly for an aerodynamic cover includes a substantially flattened aerodynamic cover adapted to be located on a body panel with a predetermined height (H) form the body panel; a first clip; and a second clip. The first clip comprises a flange and a shank adapted to engage with a stud on the body panel. The second clip includes a flange and a tubular body adapted to receive the shank therein and connect the shank therewith. The first and second clips are connected to each other in a manner that the aerodynamic cover is sandwiched and held between the flange. Thus, the aerodynamic cover is located on the body panel with the predetermined height (H) form the body panel.

19 Claims, 6 Drawing Sheets

ATTACHMENT ASSEMBLY FOR AERODYNAMIC PERFORMANCE IMPROVEMENT COVER

CROSS-REFERENCE TO RELATED APPLICATIONS

This application claims the benefit of Japanese Application No. 2007-267880, filed Oct. 15, 2007, the disclosure of which is incorporated herein by reference.

BACKGROUND OF THE INVENTION

1. Technical Field

The present invention relates to an attachment assembly for an under-cover attached to the lower surface of a vehicle body panel so as to enhance aerodynamic performance, that is, to an aerodynamic cover attachment assembly for enhancing aerodynamics.

2. Background Technology

More and more vehicles are being equipped with aerodynamic covers that, in the form of under-covers on the lower surfaces of vehicle body panels, are for enhancing fuel efficiency and aerodynamic performance. Currently, aerodynamic covers are being attached to body panels by positioning the aerodynamic cover to which clips are attached, to a body panel, on which stud bolts are erected at prescribed locations and securing the clips to the stud bolts or other bolts or the like.

FIGS. 1 to 3 diagram one example of a related art aerodynamic cover attachment assembly. An aerodynamic cover 1 in FIG. 1 is represented smaller than it actually is to simplify description, but it should be understood that in actuality, such a cover is of a size large enough to cover the entire underside of a vehicle body panel 2 in order to enhance aerodynamic performance. Similarly, the body panel 2 is also represented smaller than it actually is to simplify description, but it should be understand that in actuality, that panel is the size of the vehicle overall. The aerodynamic cover 1 is attached to the vehicle body panel 2 by a stud bolt 3 erected on the panel 2. To the aerodynamic cover 2, an A clip 5 and a B clip 6 are attached so as to effect a clamp from both sides. The A clip 5 is formed in a hollow tubular shape so as to accept the stud bolt 3, with a latching pawl 7 formed on the inside for latching onto the thread crests of the stud bolt 3. The aerodynamic cover 1, to which the A clip 5 and B clip 6 have been connected, is positioned on the body panel 2 so that the A clip 5 accepts the stud bolt 3 in the hollow part thereof. After this positioning, if the aerodynamic cover 1 is pushed against the body panel 2, the A clip 5 will be secured to the stud bolt 3, and the aerodynamic cover 1 will be secured at a prescribed location on the body panel 2.

As diagrammed in FIGS. 1 to 3, the aerodynamic cover 1 is attached, separated at a prescribed height H away from the body panel 2, to enhance aerodynamic performance. For that reason, at the position where the aerodynamic cover 1 is attached to the body panel 2, the aerodynamic cover 1 is formed so as to have a recess 9 so that the aerodynamic cover 1 can be brought close to the body panel 2. This recess 9 invites a change in the air flow, as indicated by the arrow in FIG. 10, whereupon there is a danger of the enhancement in aerodynamic performance being hindered. With an aerodynamic cover 1 made of plastic, moreover, which is ordinarily molded by hot press molding, requiring a deep recess 9 (having a depth h that is close to the prescribed height H) at the attachment position, the ease wherewith the aerodynamic cover 1 is molded is impaired.

Patent Literature 1: TOKKAI [Unexamined Patent Application Publication] No. H7-081629/1995 (Gazette)
Patent Literature 2: TOKKAI No. 2006-205910 (Gazette)
Patent Literature 3: TOKKAI No. 2007-145097 (Gazette)

DISCLOSURE OF THE INVENTION

In Patent Literature 1, a structure is described for enhancing the rigidity of an under-cover attached to the lower surface of a body panel and suppressing vibration in that under-cover. In Patent Literature 1, a structure relating to the enhancement of the rigidity of an under-cover is indicated, but no structure is described for effecting attachment so as to enhance the aerodynamic performance of an aerodynamic cover.

In Patent Literature 2, a structure for attaching an under-cover to a body panel is described. Although this improves the structure of the under-cover in order to smooth the air flow, recesses are formed in the places on the under-cover where the body panel is attached to. Because of those recesses, there is a danger of both the enhancement of aerodynamic performance and the ease of molding the aerodynamic cover being impaired. In Patent Literature 3, an under-cover is described for reducing the resistance to the flow of air over the underside of a vehicle. Because the under-cover of Patent Literature 3 requires recesses, there is a danger of both the enhancement of aerodynamic performance and the ease of molding the aerodynamic cover being impaired, in like manner as with the under-cover of Patent Literature 2.

Accordingly, an object of the present invention is to provide an aerodynamic cover attachment assembly which does not require a recess to be formed in the aerodynamic cover where it is attached to the body panel.

In order to achieve said object, the present invention provides an attachment assembly for an aerodynamics-enhancing aerodynamic cover attached to the lower surface of a vehicle body panel, for enhancing aerodynamic performance, comprising a substantially flat plate-shaped aerodynamic cover deployed at a position at a prescribed height from the body panel; and a first clip and second clip for attaching to the body panel at the prescribed height, wherein the first clip comprises a flange for making flush contact with the upper surface of the aerodynamic cover and a shank descending straight down from the flange; the second clip comprises a flange for making flush contact with the lower surface of the aerodynamic cover, and a tubular member for accepting the shank of the first clip and connecting with the shank; wherewith the shank of the first clip is accepted in the tubular member of the second clip, such that the aerodynamic cover is clamped between the flange of the first clip and the flange of the second clip, whereupon, by connection means of the shank and connection means of the tubular member, the first clip and the second clip are connected together so as to hold the aerodynamic cover; the lengths of the shank of the first clip and of the tubular member of the second clip, which have been connected, are selected to lengths corresponding to the prescribed height; and the aerodynamic cover can be deployed at a position that is at the prescribed height from the body panel.

By the attachment assembly described above, the aerodynamic cover is situated, by the first clip and second clip, at a position at a prescribed height from the body panel, whereupon the necessity of having a deep recess formed in the aerodynamic cover where it is attached to the body panel is eliminated. As a consequence, the air flow passing over the aerodynamic cover is smooth, and the ease of molding the aerodynamic cover is not impaired by forming a deep recess therein.

In the aerodynamic cover attachment assembly described above, a bolt is erected in the body panel, the shank of the first clip is formed hollow so as to accept the bolt, and latching pawls for latching onto the threads of the accepted bolt are provided in the shank, whereupon when the shank is pushed in so as to accept the bolt, the first clip is secured to the body panel, and the aerodynamic cover that is held by the first clip and the second clip is attached to the body panel. The bolt may be an ordinary bolt or a stud bolt.

On the upper surface of the flange of the first clip, a turning assisting shape, such as a finger-grip rib or tool engagement channel, for turning the shank of the first clip about the axis thereof, should preferably be formed. Thereby, it becomes possible to remove the aerodynamic cover or effect tightening when securing it. On the outer surface of the shank of the first clip, at a position adjacent to the flange of the first clip, a circum-ferential channel is formed for forming a latching shoulder, constituting the connection means, and, at positions adjacent to the flange of the second clip, locking pawls are formed, constituting the other connection means, whereupon when the shank of the first clip is pushed into the tubular member of the second clip, the locking pawls latch in the circumferential channel, and the first clip and the second clip are connected together.

The portion of the aerodynamic cover to which the flange of the first clip makes flush contact is formed flat together with the adjacent portions thereof. When that is the case, molding is unnecessary in the attachment portion of the aerodynamic cover. In another embodiment, the portion of the aerodynamic cover to which the flange of the first clip makes flush contact is formed so as to be recessed from the adjacent portions thereof by the thickness of the flange of the first clip, and the flange of the first clip and the portion of the aerodynamic cover adjacent to the flange are made a continuously flat surface. Thereupon, the air flow over the upper surface of the aerodynamic cover becomes smooth. In either case, no molding of a deep recess in the aerodynamic cover is needed.

DETAILED DESCRIPTION OF THE EXEMPLARY EMBODIMENTS OF THE INVENTION

Figure 4:
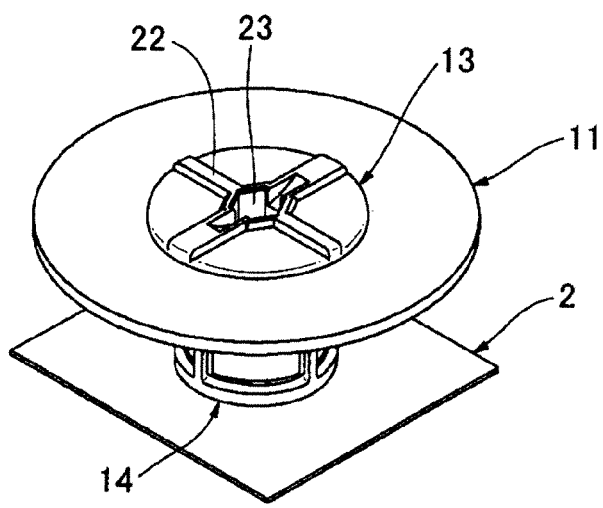
FIG. 4 is a diagonal view of an aerodynamic cover attachment assembly relating to a first exemplary embodiment of the present invention.
Figure 8:
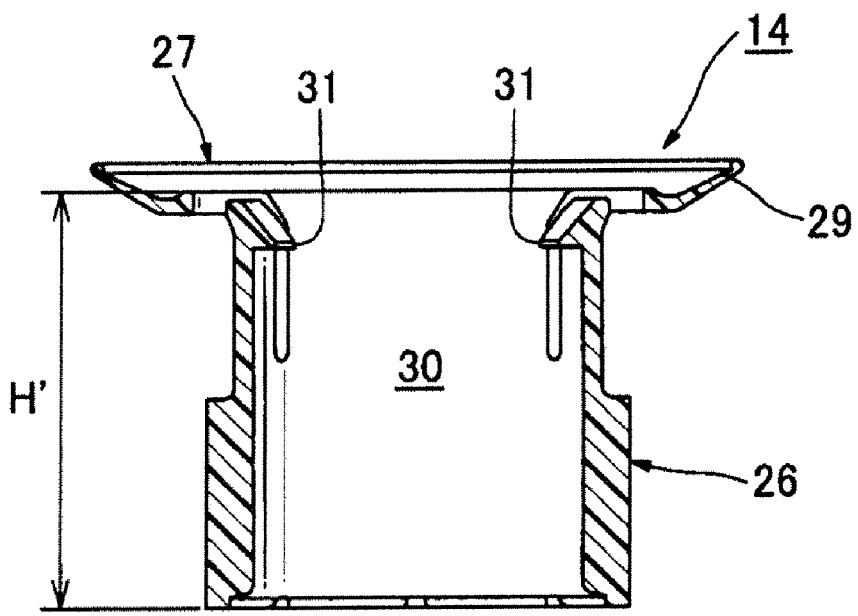
FIG. 8 is a section at the A-A line of the second clip diagrammed in FIG. 7.
Figure 9:
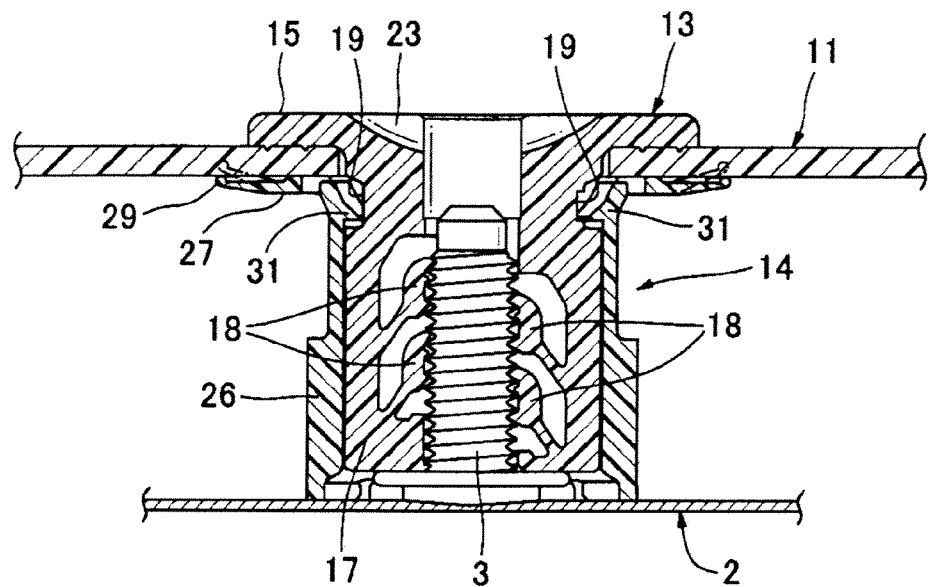
FIG. 9 is a section of the aerodynamic cover attachment assembly relating to the first exemplary embodiment of the present invention.
Figure 10:
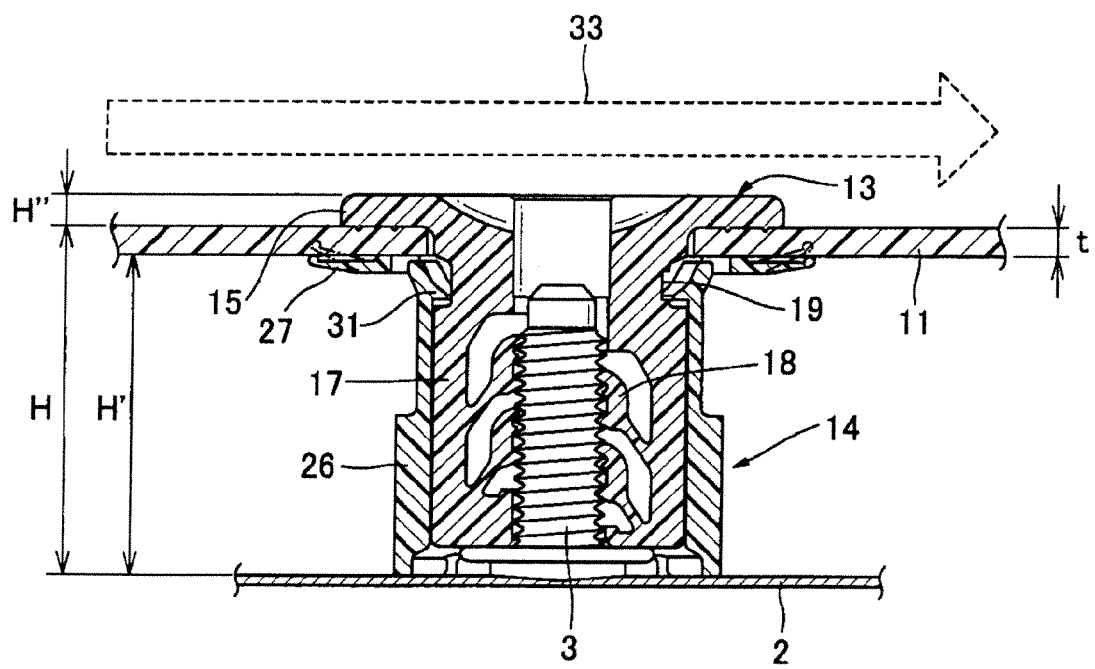
FIG. 10 is a section of the aerodynamic cover attachment assembly diagrammed in FIG. 9, with dimensions and air flow indicated.
Figure 11:
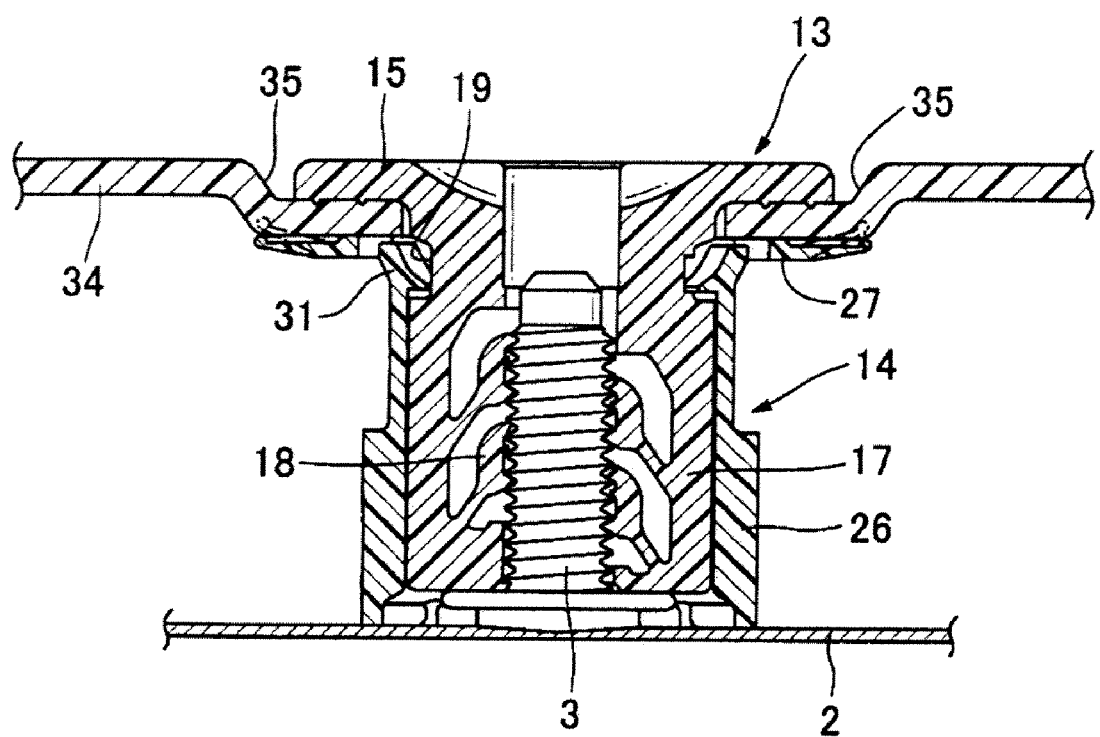
FIG. 11 is a section of an aerodynamic cover attachment assembly relating to a second exemplary embodiment of the present invention.

FIG. 4 represents an attachment assembly for an aerodynamic cover 11, relating to one embodiment of the present invention. In FIG. 4, the aerodynamic cover 11 is represented as being smaller than it actually is to simplify description, but it should be understood that in actuality, such a cover is of a size large enough to cover the entire underside of a vehicle body panel 2 in order to enhance aerodynamic performance, and, similarly, the body panel 2 is represented as being smaller than it actually is, but it should be understood that in actuality, that panel is the size of the vehicle overall. The aerodynamic cover 11 has a hole formed therein, at the attachment position, and is clamped by a first clip 13 made of hard plastic, as diagrammed in FIGS. 5 and 6, and a second clip 14 made of hard plastic, as diagrammed in FIGS. 7 and 8. The aerodynamic cover 11, unlike the conventional aerodynamic cover 1, is formed flat or substantially flat at the attachment position, with no deep recess 9 formed therein as in the conventional aerodynamic cover 1. FIG. 9 diagrams how the aerodynamic cover 11, clamped by the first clip 13 and the second clip 14, is attached to a body panel 2 whereon a stud bolt 3 is erected. In FIG. 10, the dimensions of the attachment assembly for the aerodynamic cover 11 relating to an exemplary embodiment of the present invention are compared to those of the related art attachment assembly for the aerodynamic cover 1. FIG. 11 represents an aerodynamic cover attachment assembly relating to a second exemplary embodiment of the present invention. A stud bolt 3 is provided in the body panel 2, but such bolt is not limited to a stud bolt, and an ordinary bolt may be erected instead. An attachment hole may also be provided in the body panel.

Figure 5:
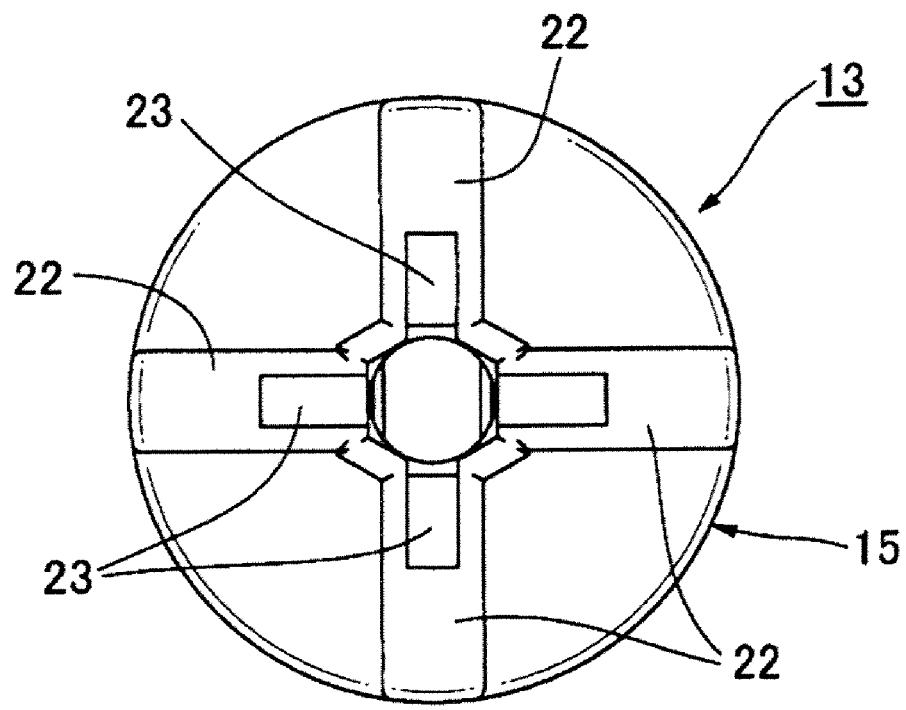
FIG. 5 is a plan of a first clip relating to the first exemplary embodiment of the present invention.
Figure 6:
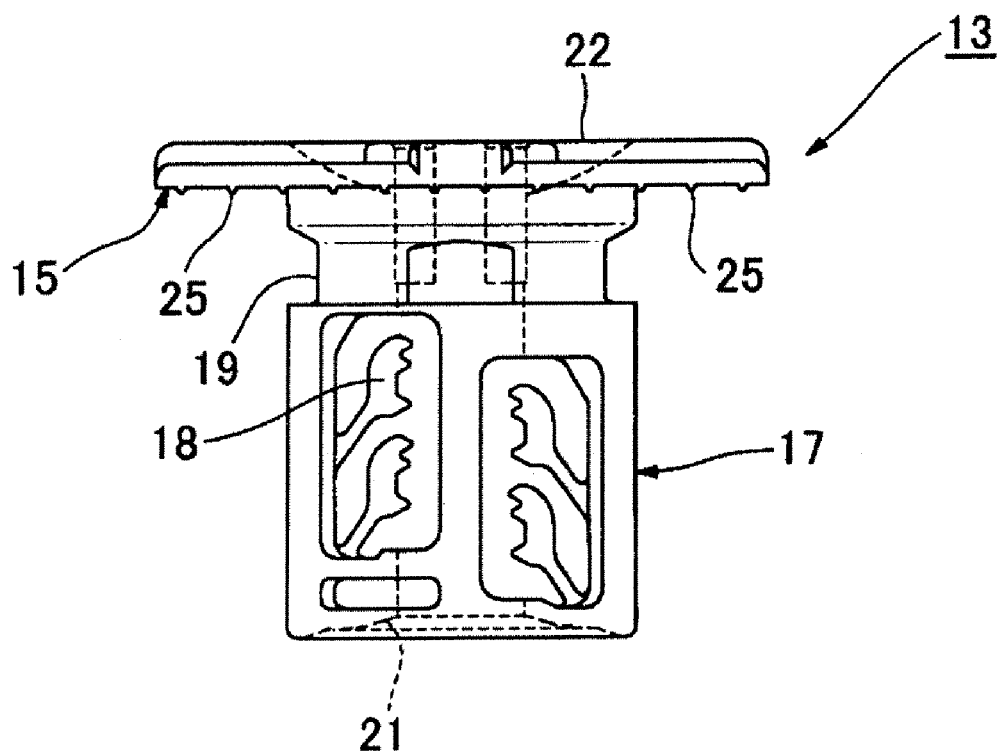
FIG. 6 is a front elevation of the first clip diagrammed in FIG. 5.

The first clip 13 is now described with reference to FIGS. 5 and 6. The first clip 13 comprises a circular plate-shaped flange 15, and a hollow cylindrical shank 17 that extends a certain length downward from the flange 15. The lower surface of the flange 15 makes flush contact with the upper surface of the aerodynamic cover 11. The height of the shank 17 is selected according to a prescribed height H by which the aerodynamic cover 11 is separated from the body panel 2 and according to the thickness t of the aerodynamic cover 11 (see FIG. 10). The shank 17 accepts the stud bolt 3 into the inner hollow portion thereof, and is secured to the stud bolt 3. Elastic latching pawls 18 are provided in a pair inside the shank 17 for securing to the stud bolt 3. The elastic latching pawls 18 may be a pair of latching pawls, or latching pawls of a shape other than that diagrammed, so long as the force wherewith they latch to the stud bolt 3 is large and the force wherewith the shank 17 is pushed in can be made small. Between the shank 17 and the flange 15, as means for connecting to the second clip, a circumferential channel 19 is formed, for accepting locking pawls 31 that constitute shank connection means and for forming a latching shoulder to be latched onto. In the hollow portion at the lower end of the shank 17, guide holes 21 that widen at the ends are formed for guiding the stud bolt 3.

On the upper surface of the flange 15, cross-shaped ribs 22 are formed so that the shank 17 of the first clip 13 can be turned about its axis with the fingers or the like. Thereby, the first clip 13 that is latched to the stud bolt 3 can be turned in the direction of detachment, making easy detachment of the aerodynamic cover 11 possible. As diagrammed in FIG. 5, moreover, cross-shaped channels 23 for a Phillips screwdriver may be formed at the center axis of the cross-shaped ribs 22, whereby the first clip 13 can be turned about its axis by a Phillips screwdriver also. These cross-shaped ribs 22 and channels 23 are of a turning assisting shape for assisting the turning of the first clip 13. The first clip 13 can also be turned in a direction wherewith the securing force is increased, so that a large securing force can be obtained. In the lower surface of the flange 15, a plurality of projections 25, which protrude to the aerodynamic cover 11 making flush contact, should preferably be formed. Thereby, the first clip 13 is prevented from turning about its axis due to vehicle vibration or the like, and loosening of the securing forces is prevented.

Figure 7:
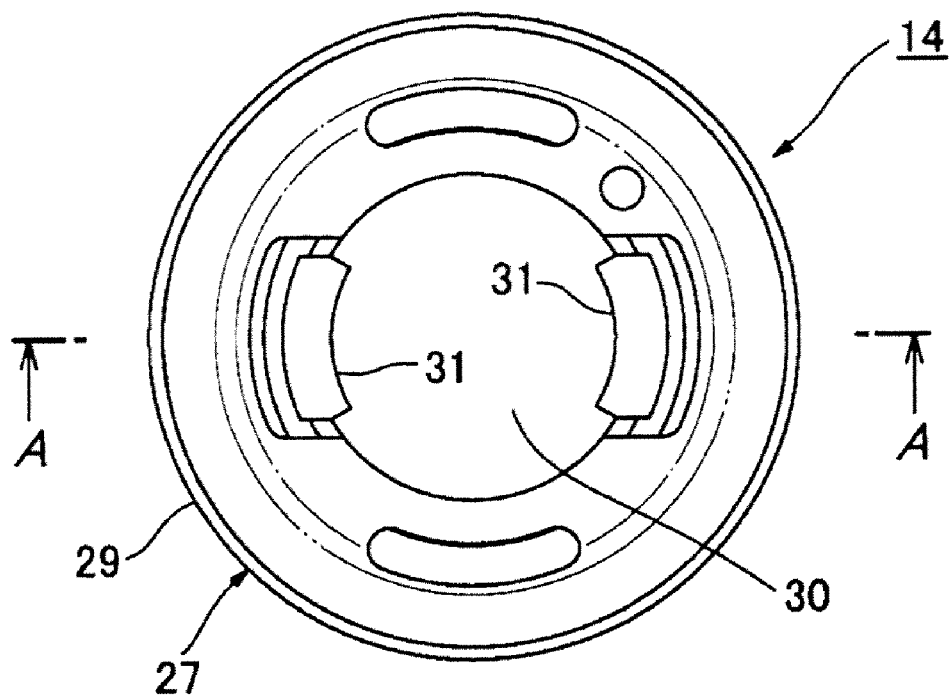
FIG. 7 is a plan of a second clip relating to the first exemplary embodiment of the present invention.

The second clip 14 is now described with reference to FIGS. 7 and 8. The second clip 14 comprises a tubular member 26 having an inner diameter that will accept the shank 17 of the first clip 13, and a flange 27, formed at the upper end of the tubular member 26, that presses against and makes flush contact with the lower surface of the aerodynamic cover 11. Flexibility is imparted to the flange 27 such that the outer edge 29 thereof flexes and presses against the lower surface of the aerodynamic cover 11. The tubular member 26 has a hollow portion 30 of a size that will accept the shank 17 of the first clip 13. In the tubular member 26, at positions adjacent to the flange 27, a pair of locking pawls 31 is formed, as connection means, for latching on the latching shoulder of the circumferential channel 19 in the accepted shank 17 so that the first clip 13 will not separate from the second clip 14. The locking pawls 31 flex outward in the radial direction when the shank 17 of the first clip 13 is accepted in the tubular member 26, then return to positions on the inside, in the radial direction, when accommodated in the circumferential channel 19 of the shank 17, latch on the latching shoulder formed by the circumferential channel 19, and connect the second clip 14 to the first clip 13. The height of the tubular member 26 is selected so that, as diagrammed in FIG. 8, it is equal to the height H' from the lower end of the tubular member to the position on the flange 27 that makes flush contact with the aerodynamic cover ([H']=H(prescribed height)−t (thickness of aerodynamic cover)).

FIG. 9 diagrams how the aerodynamic cover 11, clamped by the first clip 13 and the second clip 14, is attached to the body panel 2 on which the stud bolt 3 is erected. The aerodynamic cover 11 is clamped by the flange 15 of the first clip 13 and the flange 27 of the second clip 14. The shank 17 of the first clip 13 is accommodated in the tubular member 26 of the second clip 14, the locking pawls 31 of the second clip 14 latch on the latching shoulder of the circumferential channel 19 in the first clip 13, and the condition whereby the aerodynamic cover 11 is clamped by the flange 15 of the first clip 13 and the flange 27 of the second clip 14 is maintained. The outer edge of the flange 27 of the second clip 14 flexes on the lower side and presses against the aerodynamic cover 11 so that the latter pushes back against that flexing.

The shank 17 of the first clip 13 has thereupon accepted the stud bolt 3 erected on the body panel 2, the elastic latching pawls 18 are latching on the threads of the stud bolt 3, the first clip 13 is secured to the stud bolt 3, and the body panel 2 is secured to. Because the first clip 13 is holding the aerodynamic cover 11 in conjunction with the second clip 14, the aerodynamic cover 11 is secured to the body panel 2.

When the stud bolt 3 or an ordinary bolt has been erected on the body panel 2, the body panel 2 can be secured to by the shank 17 and elastic latching pawls 18 of the first clip, as already described. When, instead of a bolt or the like, an attachment hole is formed in the body panel 2, an anchor leg clip or the like, which is inserted into and latched to that attachment hole, may be provided, either in the lower end portion of the first clip 13 or the lower end portion of the second clip 14.

Figure 1:
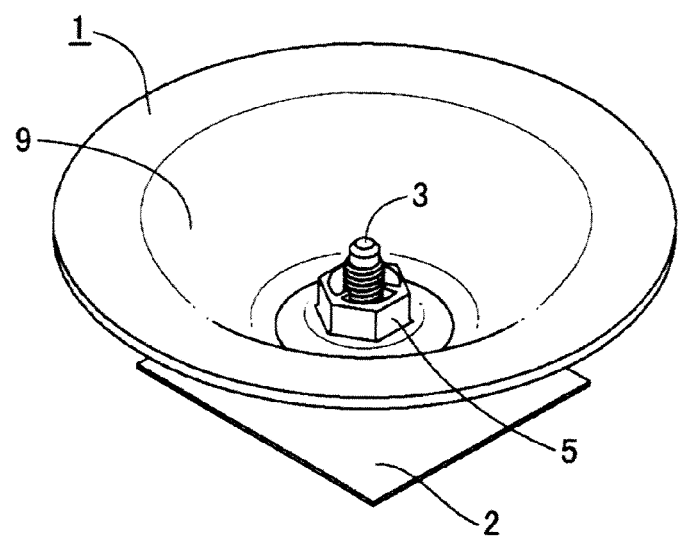
FIG. 1 is a diagonal view of a related art aerodynamic cover attachment assembly.
Figure 2:
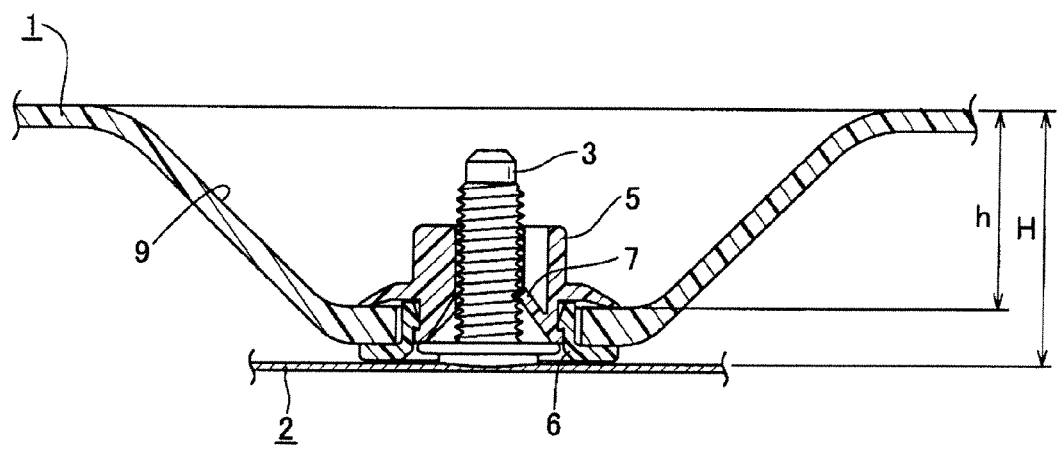
FIG. 2 is a section of a related art aerodynamic cover attachment assembly.
Figure 3:
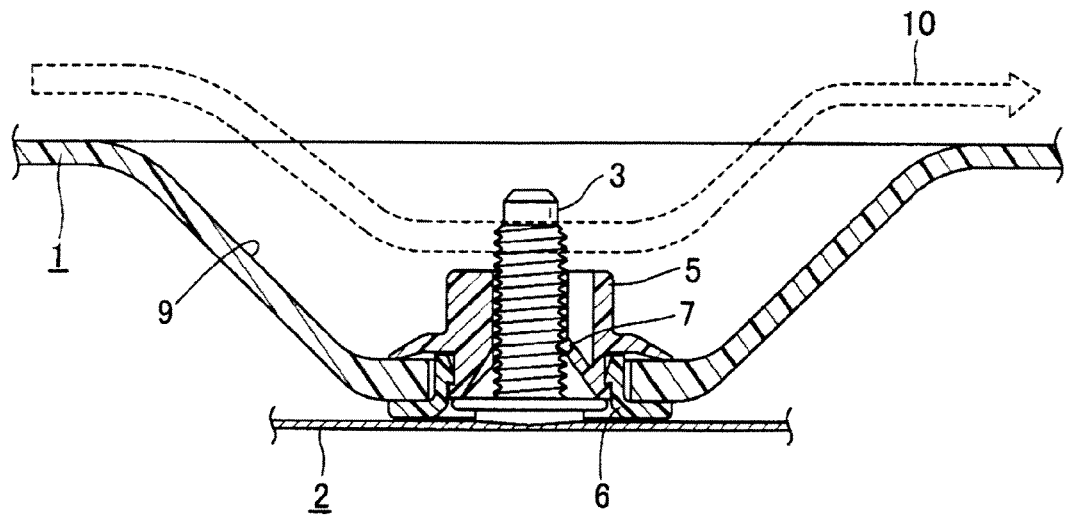
FIG. 3 is a section representing the air flow over the related art aerodynamic cover attachment assembly diagrammed in FIG. 2.

As diagrammed in FIG. 10, the aerodynamic cover 11 is secured by the first clip 13 and the second clip 14 to the body panel 2 at a height H position at which the aerodynamic performance of the that body panel 2 is enhanced. As diagrammed in FIG. 10, moreover, the aerodynamic cover 11, by the second clip 14 and the first clip 13 formed at the prescribed height, is formed so as to remain flat without the necessity of a recess at the attachment position where the stud bolt 3 is erected. As a consequence, the air flow remains smooth, without changing, as indicated by the arrow 33 in FIG. 10. In contrast thereto, with the related art aerodynamic cover attachment assembly as diagrammed in FIGS. 2 and 3, the aerodynamic cover 1 requires a recess 9 at the attachment position where the stud bolt 3 is located and, in order to form the recess, drawing to a depth h is also necessary. The diameter of the recess 9 must be made large, moreover, so as to secure the necessary holding range for the A clip 5, to effect attachment to the stud bolt 3. Accordingly, with the related art attachment assembly, undesirable air flow develops, as indicated by the arrow 10 in FIG. 3. Such problems are eliminated by the attachment assembly according to an exemplary embodiment of the present invention.

FIG. 11 diagrams an aerodynamic cover attachment assembly relating to a second exemplary embodiment of the present invention. In FIG. 11, an aerodynamic cover 34 is formed so as to have a recess 35 that is recessed by the thickness H" of the flange 15 of the first clip 13 (cf. FIG. 10). The first clip 13 and second clip 14 are the same as in the first embodiment. In the aerodynamic cover 11 in the attachment assembly of the first embodiment, as diagrammed in FIG. 10, the flange 15 of the first clip 13 protrudes from the upper surface of the aerodynamic cover 34 by the thickness H" thereof. With the attachment assembly of the second embodiment diagrammed in FIG. 11, that thickness H" is accommodated by the recess 35 in the aerodynamic cover 34. As a consequence, the flange 15 and the portion of the aerodynamic cover 34 adjacent to the flange 15 become a substantially continuous surface, there is no protrusion in the upper surface of the aerodynamic cover 11, an overall flat surface is effected, aerodynamic performance is further enhanced, and slipstream noise, for example, can be further reduced. Furthermore, the recess 35 need only be of a size and depth that will allow accommodation of the flange 15 of the first clip 13 and is not molded to a large size as is the recess 9 in the conventional aerodynamic cover 1, wherefore the molding thereof is easy.

What is claimed is:

1. An attachment assembly for an aerodynamics-enhancing aerodynamic cover attached to a lower surface of a vehicle body panel, comprising:
a substantially flat plate-shaped aerodynamic cover deployed at a prescribed height from the body panel; and
a first clip and second clip for attaching to said body panel at said prescribed height; wherein:
said first clip comprises a flange for making flush contact with an upper surface of said aerodynamic cover, and a shank descending straight down from said flange; said second clip comprises a flange for making flush contact with a lower surface of said aerodynamic cover, and a tubular member for accepting the shank of said first clip and connecting with said shank; wherewith:
the shank of said first clip is accepted in the tubular member of said second clip, such that said aerodynamic cover is clamped between the flange of said first clip and the flange of said second clip, whereupon, said first clip and said second clip are connected together so as to hold said aerodynamic cover; the lengths of the shank of said first clip and of the tubular member of said second clip, which have been connected, are selected to lengths corresponding to said prescribed height; and said aerodynamic cover can be deployed at a position that is at said prescribed height from said body panel.

2. The attachment assembly according to claim 1, wherein a bolt is erected in said body panel; the shank of said first clip is formed hollow so as to accept said bolt; and latching pawls for latching onto threads of the bolt are provided in said shank; whereupon, when said shank is pushed in so as to accept said bolt, the first clip is secured to said body panel, and said aerodynamic cover that is held by said first clip and said second clip is attached to said body panel.

3. The attachment assembly according to claim 2, wherein said bolt is a stud bolt.

4. The attachment assembly according to claim 2, wherein on the upper surface of the flange of said first clip, a turning assisting shape is formed for turning the shank of said first clip about its axis.

5. The attachment assembly according to claim 1, wherein on the outer surface of the shank of said first clip, at a position adjacent to the flange of said first clip, a circumferential channel is formed for forming a latching shoulder, and at positions adjacent to the flange of said second clip, locking pawls are formed, whereupon when the shank of said first clip is pushed into the tubular member of said second clip, said locking pawls latch in said circumferential channel, and said first clip and said second clip are connected together.

6. The attachment assembly according to claim 1, wherein a portion of said aerodynamic cover to which the flange of said first clip makes flush contact is formed flat together with the adjacent portions thereof.

7. The attachment assembly according to claim 1, wherein a portion of said aerodynamic cover to which the flange of said first clip makes flush contact is formed so as to be recessed from the adjacent portions thereof, by the thickness of the flange of said first clip; and the flange of said first clip and the portion of the aerodynamic cover adjacent to said flange are made a continuously flat surface.

8. An attachment assembly comprising:
a first clip comprising a hollow shank and a first flange;
a second clip comprising a tubular member and a second flange; and
a substantially flat cover held between the first flange and the second flange;
a vehicle body panel and a bolt attached to the vehicle body panel; and
wherein the bolt is received in the hollow shank of the first clip and the hollow shank of the first clip is received in the tubular member of the second clip.

9. The attachment assembly according to claim 8, wherein the first clip further comprises a latching pawl for holding the first clip on the bolt.

10. The attachment assembly according to claim 8, wherein the cover is separated from the vehicle body panel by the height of the second clip.

11. The attachment assembly according to claim 8, wherein the first flange is on an upper surface of the cover and the second flange is on a lower surface of the cover.

12. The attachment assembly according to claim 8, wherein a portion of the cover disposed directly between the first flange and the second flange is in the same plane as the remaining portions of the cover.

13. The attachment assembly according to claim 9, wherein the first clip comprises a first engagement part and the second clip comprises a second engagement part which engages the first engagement part to hold the first clip and the second clip together.

14. The attachment assembly according to claim 9, wherein the first clip comprises a channel and the second clip comprises at least one pawl which engages the channel to hold the first and second clips together.

15. The attachment assembly according to claim 14, wherein the channel is disposed between the shank and the first flange.

16. An attachment assembly for attaching to a stud projecting from a vehicle body and for holding, at a height from the vehicle body, a sheet like aerodynamic cover defining a hole and a thickness and including a first side and a second side, the attachment assembly comprising:
a first clip including:
a first shank defining an axial bore open at a first end and adapted to receive within and grip the stud; and
an upper flange located proximate a second end of the shank and projecting radially;
a second clip including:
a tubular member defining an axial through bore sized to encompass the first shank of the first clip; the tubular member including a first end and a second end; and
a lower second flange located proximate the second end of the tubular member; and
wherein when the attachment assembly is assembled around the bolt, the first shank of the first clip is located within the tubular member of the second clip and the upper first flange and lower second flange are axially spaced to clamp the thickness of the aerodynamic cover.

17. An attachment assembly according to claim 16 wherein the first clip includes latch pawls projecting radially inward into the bore of the first shank.

18. An attachment assembly according to claim 16 wherein:
the first clip includes a latching shoulder located on a radially outward surface;
the second clip includes a locking pawl that projects radially inward into the through bore; and
wherein when the attachment assembly is assembled around the bolt, the locking pawl engages the latching shoulder to prevent axially relative movement between the first clip and the second clip.

19. An attachment assembly according to claim 16 wherein the lower second flange includes a frustoconical outer edge that projects radially outward and axially away from the first end.

* * * * *